US010547335B2

(12) United States Patent
Desclos et al.

(10) Patent No.: US 10,547,335 B2
(45) Date of Patent: *Jan. 28, 2020

(54) RF INTEGRATED CIRCUIT WITH TUNABLE COMPONENT AND MEMORY

(71) Applicant: Ethertronics, Inc., San Diego, CA (US)

(72) Inventors: Laurent Desclos, San Diego, CA (US); Sebastian Rowson, San Diego, CA (US); Jeffrey Shamblin, San Marcos, CA (US); Olivier Pajona, Antibes (FR)

(73) Assignee: Ethertronics, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,601

(22) Filed: Apr. 24, 2018

(65) Prior Publication Data

US 2018/0241419 A1   Aug. 23, 2018

Related U.S. Application Data

(63) Continuation of application No. 14/569,576, filed on Dec. 12, 2014, now Pat. No. 9,960,791.

(60) Provisional application No. 61/915,481, filed on Dec. 12, 2013.

(51) Int. Cl.
*H04B 1/00* (2006.01)
*H04B 1/04* (2006.01)
*H04B 1/18* (2006.01)

(52) U.S. Cl.
CPC ......... *H04B 1/0057* (2013.01); *H04B 1/0458* (2013.01); *H04B 1/18* (2013.01)

(58) Field of Classification Search
CPC .............................. H04B 1/0458; H04B 1/006
See application file for complete search history.

(56) References Cited

U.S. PATENT DOCUMENTS

| | | | |
|---|---|---|---|
| 4,840,177 A | 6/1989 | Charbonnier | |
| 8,072,285 B2 | 12/2011 | Spears | |
| 8,421,548 B2 | 4/2013 | Spears | |
| 8,774,067 B2 * | 7/2014 | Rousu | H01Q 1/242 333/126 |
| 8,971,826 B2 * | 3/2015 | Abdul-Gaffoor | H03K 17/955 455/77 |
| 8,995,936 B2 | 3/2015 | Desclos et al. | |
| 9,231,669 B2 | 1/2016 | Desclos et al. | |
| 9,590,703 B2 | 3/2017 | Desclos et al. | |
| 9,641,201 B2 | 5/2017 | Bakalski | |
| 2004/0100534 A1 * | 5/2004 | Tien | B41J 2/04541 347/59 |

(Continued)

*Primary Examiner* — Cindy Trandai
(74) *Attorney, Agent, or Firm* — Dority & Manning, P.A.

(57) ABSTRACT

An RFIC with memory is described where the memory can be used to house a look-up table for tuning components designed into the RFIC, providing a customized tuning circuit for antenna and transceiver front-end tuning applications. The look-up table can be loaded at wafer level during the manufacturing process to customize an RFIC design for a specific antenna system. The memory can be used to restrict or tailor the tuning range of tunable capacitors and switches within the RFIC to optimize performance in the end application. The resident memory will improve signaling latency when tuning for time critical applications such as channel tuning in a cellular communication system.

20 Claims, 11 Drawing Sheets

(56) References Cited

U.S. PATENT DOCUMENTS

| | | | |
|---|---|---|---|
| 2006/0213988 A1* | 9/2006 | Wang | G06Q 10/00 235/385 |
| 2008/0122712 A1* | 5/2008 | Chen | H01Q 9/0471 343/745 |
| 2008/0164464 A1 | 7/2008 | Kato | |
| 2008/0254743 A1* | 10/2008 | Nishikawa | H04B 7/1555 455/24 |
| 2009/0117855 A1 | 5/2009 | Rofougaran | |
| 2009/0168753 A1* | 7/2009 | Campero | G01S 13/825 370/351 |
| 2009/0285135 A1* | 11/2009 | Rousu | H04B 1/0057 370/297 |
| 2010/0073103 A1* | 3/2010 | Spears | H03H 7/40 333/17.3 |
| 2010/0134257 A1 | 6/2010 | Puleston | |
| 2010/0156552 A1 | 6/2010 | McKinzie, III | |
| 2011/0086600 A1 | 4/2011 | Muhammad | |
| 2011/0105023 A1 | 5/2011 | Scheer | |
| 2011/0243037 A1* | 10/2011 | Sundstrom | H04B 7/15542 370/279 |
| 2011/0254751 A1 | 10/2011 | Bengtsson | |
| 2012/0003947 A1* | 1/2012 | Su | H04B 1/0458 455/150.1 |
| 2012/0295554 A1 | 11/2012 | Greene | |
| 2012/0302188 A1 | 11/2012 | Sahota | |
| 2013/0005278 A1* | 1/2013 | Black | H01Q 1/241 455/77 |
| 2013/0069737 A1 | 3/2013 | See | |
| 2013/0099993 A1 | 4/2013 | Tung et al. | |
| 2013/0109333 A1 | 5/2013 | Rowson | |
| 2013/0154897 A1 | 6/2013 | Sorensen | |
| 2013/0187828 A1 | 7/2013 | Desclos et al. | |
| 2013/0251010 A1 | 9/2013 | Alberth | |
| 2013/0278477 A1* | 10/2013 | Dupuy | H01Q 1/50 343/852 |
| 2013/0309980 A1* | 11/2013 | Seth | H03J 5/00 455/77 |
| 2014/0004804 A1 | 1/2014 | Suh | |
| 2014/0049442 A1* | 2/2014 | Yen | H04B 1/0458 343/861 |
| 2014/0080409 A1* | 3/2014 | Frankland | H02J 5/005 455/41.1 |
| 2014/0177686 A1* | 6/2014 | Greene | H04B 1/18 375/219 |
| 2014/0184445 A1 | 7/2014 | Desclos et al. | |
| 2015/0311922 A1* | 10/2015 | Bakalski | H04B 1/006 455/552.1 |
| 2015/0340769 A1 | 11/2015 | Desclos et al. | |
| 2017/0170564 A1* | 6/2017 | Velandia Torres | H01Q 7/005 |
| 2017/0346178 A1* | 11/2017 | Shi | H04B 17/102 |

* cited by examiner

DESIGN PHASE PROCESS

OPERATION PHASE PROCESS

RF INTEGRATED CIRCUIT WITH TUNABLE COMPONENT AND MEMORY

CROSS-REFERENCE TO RELATED APPLICATIONS

The present application is a continuation of U.S. application Ser. No. 14/569,576, filed Dec. 1, 2014, titled "RF INTEGRATED CIRCUIT WITH TUNABLE COMPONENT AND MEMORY," which claims benefit of priority to U.S. Provisional Application Ser. No. 61/915,481, filed Dec. 12, 2013, titled "TUNABLE COMPONENT WITH MEMORY"; the contents of which are hereby incorporated by reference.

BACKGROUND

Field of the Invention

This invention relates generally to the field of wireless communication; and more particularly, to components used in tuning circuits and methods of dynamically adjusting RF communication system performance.

Description of the Related Art

As the need for higher data rates increases, communication systems are being designed to cover wider instantaneous frequency bandwidths. Also, with the introduction of 4G protocols such as Long Term Evolution (LTE), additional frequency bands are being used for cellular communication systems. In mobile communication systems, backward compatibility is required for cell phones being designed for 4G LTE applications such that the cell phone must be capable of operating at the 2G and 3G cellular bands as well as the 4G frequency bands. In addition, LTE as a protocol is configured to accommodate carrier aggregation, where multiple channels can be transmitted or received on simultaneously to increase instantaneous bandwidth. This aggregation of channels can cover up to five channels spread across multiple frequency bands. All of these trends point toward a growing need for more flexibility in the RF front-end of mobile communication systems to address the combining of multiple frequency bands and modes.

Dynamic tuning of antennas and RF front-ends of communication systems is picking up adoption in the commercial communications industry, and proper implementation of dynamic tuning methods can bring improvements to communication system performance as the number of frequency bands that can be accessed grows and the instantaneous bandwidths required increases. As antennas in mobile communication systems transition from passive types to active antenna systems, look-up tables and/or algorithms will be required to control the antenna tuning. Open loop antenna tuning will require a look-up table which contains tuning state information as a function of frequency, use case, and other sensor information. Closed loop antenna tuning will require an algorithm to control components to converge to a matched condition for impedance tuning, or will require an algorithm to select the optimal radiation pattern in a smart antenna or beam-steering antenna system. Look-up tables and algorithms require memory to store the information. The look-up table or algorithm can be stored in memory at a location within the host device that the active antenna system or RF front-end is integrated into. The latency of the signaling to control the active antenna system or RF front-end will be dependent on the location of the memory available for the look-up table or algorithm, and will also be dependent on the communication bus used in the communication to control functionality.

Integrating active antenna systems and/or tunable RF front-end systems require an added step of loading information in the form of a look-up table or algorithm in memory of the host device. The latency of the tuning function needs to be determined based upon the host system design and the location of the memory used for information storage. For more complex communication systems where there might be an active antenna system and multiple tuning functions associated with an RF front-end module, multiple components will require memory from the host device. There is a need for simplifying the memory requirements as more tuning type circuits are integrated into communication systems. The enclosed embodiments address this problem and provide a unique set of capabilities to improve system performance along with simplifying the integration process.

SUMMARY OF THE INVENTION

A radio frequency integrated circuit (RFIC) with memory is described where the memory can be used to house a look-up table for tuning components designed into the RFIC, providing a customized tuning circuit for antenna and transceiver front-end tuning applications. The look-up table can be loaded at wafer level during the manufacturing process to customize an RFIC design for a specific antenna system. The memory can be used to restrict or tailor the tuning range of tunable capacitors and switches within the RFIC to optimize performance in the end application. The resident memory will improve signaling latency when tuning for time critical applications such as channel tuning in a cellular communication system.

DETAILED DESCRIPTION

Figure 1:
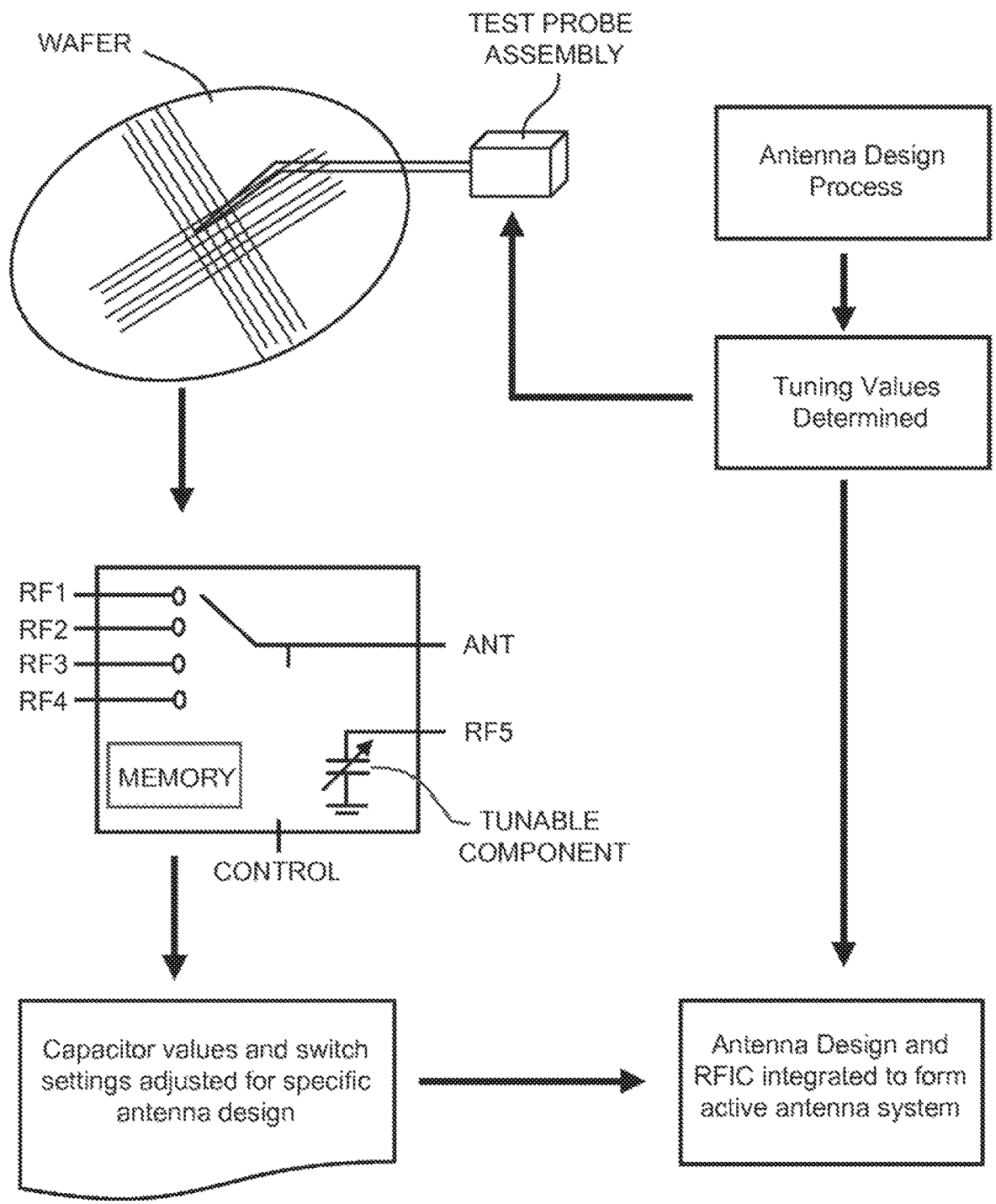
FIG. 1 illustrates a process where an RFIC containing memory is encoded during the manufacturing process with information specific to an antenna design.

Radio Frequency Integrated Circuit (RFIC) architectures, and a related method of integrating memory into an RFIC and using the memory to house a look-up table or other information specific to the RFIC and the intended application, are each described herein. The method provides a technique to customize an RFIC for an active antenna application.

One embodiment includes loading a look-up table into memory resident in an RFIC, wherein the RFIC contains one or a plurality of tunable capacitors and/or switches for use in tuning RF circuits or antennas. The look-up table has set values to customize the tuning circuit to a specific antenna design. The benefit of having the look-up table in the RFIC is the lack of requirement for the host communication device to provide memory for population of the look-up table. This will also reduce the time and complexity of integrating an active antenna system into a communication device since the look-up table can be loaded in the RFIC prior to installation of the RFIC in the system. Erasable Programmable Read Only Memory (EPROM) memory cells can be integrated to serve the memory function.

Another embodiment includes a method wherein the look-up table is loaded while the RFIC is still on wafer; this technique will decrease the time of loading the look-up table compared to loading the information after RFIC removal from the wafer. This provides the capability of customizing the RFIC for a specific antenna design, with the antenna design process running concurrent with the RFIC fabrication cycle. The RFIC and antenna design can be brought together to form a complete active antenna solution with look-up table resident with the design and loaded in the RFIC prior to integrating the active antenna system into a communication end product. This function will require EPROM memory since the look-up table is loaded while the RFIC is on-wafer.

Another embodiment includes a method of measuring RFIC switch port performance during functional test of the RFIC and populating the look-up table in the memory of the RFIC to denote the best switch ports to use for low loss and/or low or high frequency functions. This method will provide the capability of specifying which function is provided access to the lowest loss switch port to ensure optimal overall system performance. Similarly, tunable capacitors can be measured during functional test and key metrics such as Cmin (minimum capacitance) can be determined. This information can be stored in memory and used to specify which tunable capacitor in an RFIC will provide best low capacitance performance (based on Cmin for example). Depending on the RFIC topology and pin-out characteristics a decision can be made as to which tunable capacitor in a multi-capacitor assembly to use for the most critical function.

In another embodiment, an RFIC which contains a separate tunable capacitor and multi-port switch can be customized to synchronize tuning capability of these components for specific applications. A tunable capacitor, which has a defined number of capacitive tuning states and defined $C_{min}$ and $C_{max}$ can be used in conjunction with the switch ports to provide tuning capability to form an active antenna system or to tune an RF circuit. The memory resident in the RFIC can be used to house a look-up table that defines customized $C_{min}$ and $C_{max}$ values per switch port, to restrict or tailor tuning capability for each port. This feature can be used to minimize the possibility of generating harmonics which could be caused by generating an impedance at the desired frequency of operation. Also, in situations where linearity of a circuit is dependent on maintaining a specific range of impedance values, the tuning range of the tunable capacitor can be restricted to a pre-determined set of values. Furthermore, the capacitor tuning range per switch port setting can be set during the design and manufacturing phase, with the look-up table populated in the RFIC prior to installation in the end communication device. This will eliminate the possibility of changes made to the tuning range of the RFIC once the RFIC is integrated into the communication device. This embodiment can be implemented whether the memory is EPROM or Random Access Memory (RAM) since the method of relating tunable capacitor values to specific switch ports can take place during the manufacturing process or from information loaded from on-board memory that is transferred to the RFIC after integration into a host device.

In another embodiment, the memory resident in the RFIC can be used to house a look-up table or other information needed to command or drive the RFIC tuning function. The look-up table or other information in the on-board memory eliminates the need of populating the look-up table or information in a remote memory cell elsewhere in a communication system. This will translate into reduced latency of the signaling required to drive the tuning function of the RFIC. This can be important for applications involving channel tuning in the front-end of a mobile communication system or for radiation pattern selection in smart antenna applications where multiple radiation patterns are required to be sampled in a short timeframe.

In another embodiment, information stored in memory in the RFIC can be used to provide control information to additional RFICs. This serves an important function from a sub-system perspective as this will provide low latency signaling for a group of RFICs which are configured as part of a larger, distributed system. By placing memory in one RFIC and using this memory to service the needs of additional RFICs, timing considerations can be addressed more efficiently compared to relying on memory cells in a remote location in a distributed architecture such as a mobile communication system. One example of this configuration is an RFIC tuning component (termed the primary RFIC) with integrated memory, where the memory in this RFIC is used to store a look-up table for an additional RFIC (termed the secondary RFIC) as well as the primary RFIC. This secondary RFIC could be a filtering module that requires information to be stored that is used to enable tuning states or configurations. By storing the look-up table in the primary RFIC with information to enable both primary and secondary RFICs, these two RFICs can have look-up tables or other information pre-loaded prior to integration into a communication system or other end product. As an extension, by storing the look-up table of a third RFIC in the memory of the primary RFIC, a more complex sub-system can be integrated into a communication system without requiring memory cells from the host device for these multiple components.

In yet another embodiment, a feature is designed into the RFIC such that the memory cell can be permanently locked or fixed based upon a command after loading a look-up table or other information. When combined in an RFIC configured for tuning, and integrated with a custom antenna design, this combination of components results in a novel active antenna system containing antenna structure, tuning circuit, and look-up table, wherein the look-up table cannot be modified after integration in an end device. This feature will ensure that the active antenna system cannot be modified after integration into the end device, guaranteeing that the tuning states specified during design and development phase remain in place. Depending on the function of the RFIC, this feature could ensure that power levels are not exceeded, linearity requirements are maintained, and that the frequency response of the individual tuning states of an active antenna system are not altered.

Now turning to the drawings, FIG. 1 illustrates a process where an RFIC containing memory is encoded during the manufacturing process with information specific to an antenna design. Information relevant to antenna tuning states is loaded in the form of a look-up table while the RFIC is still on the wafer. The RFIC can then be removed from the wafer and integrated with the antenna design to form a custom active antenna system.

Figure 2:
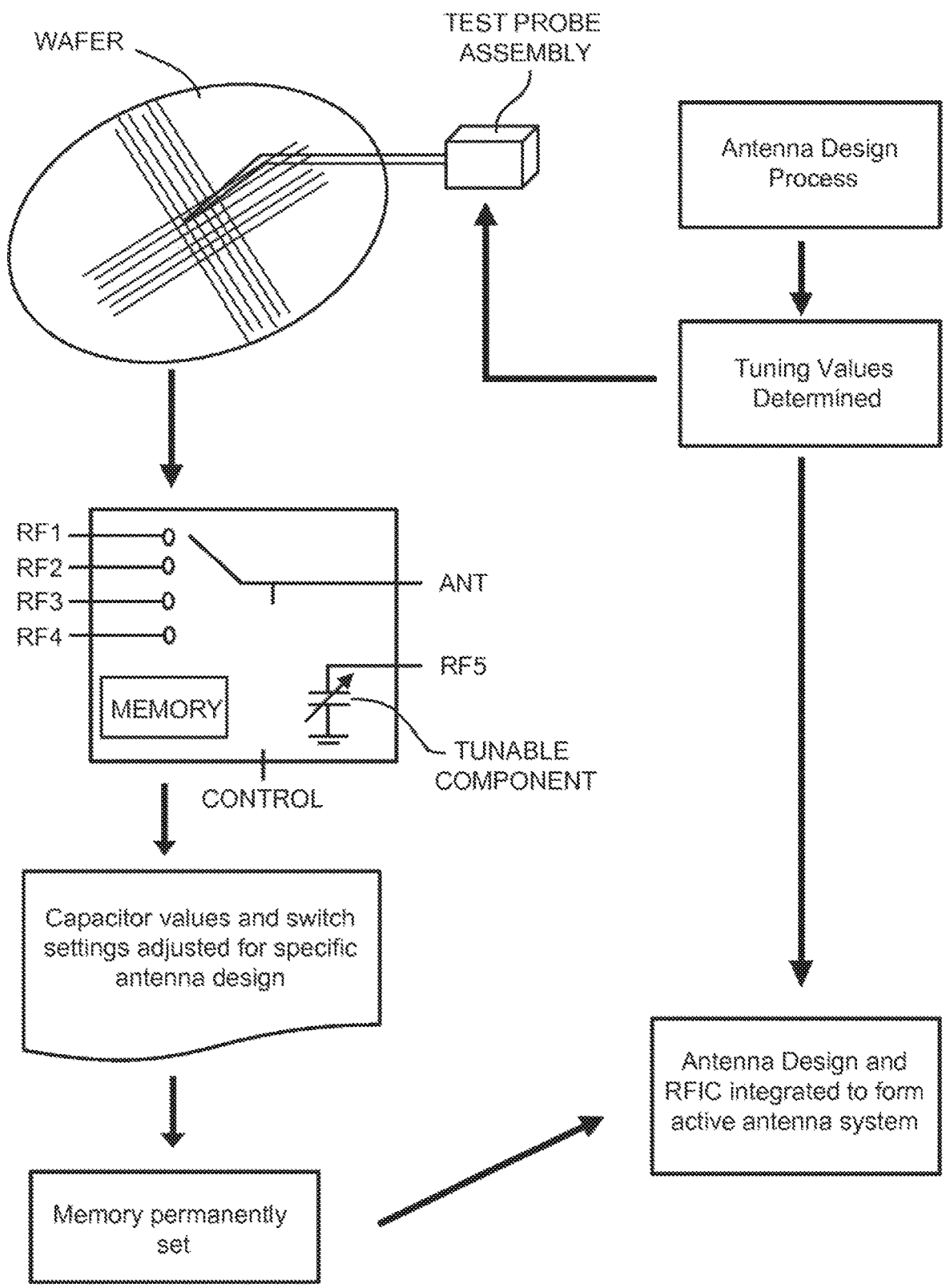
FIG. 2 illustrates a process where an RFIC containing memory is encoded during the manufacturing process with information specific to an antenna design and memory is permanently set.

FIG. 2 illustrates a process where an RFIC containing memory is encoded during the manufacturing process with information specific to an antenna design. Information relevant to antenna tuning states are loaded in the form of a look-up table while the RFIC is still on the wafer. For an RFIC containing tunable capacitors and multi-port switches, the capacitor values can be customized per switch port setting. A function to permanently set or fix the memory is implemented in this process to eliminate the possibility of changing the information once loaded into memory. The RFIC can then be removed from the wafer and integrated with the antenna design to form a custom active antenna system.

Figure 3:
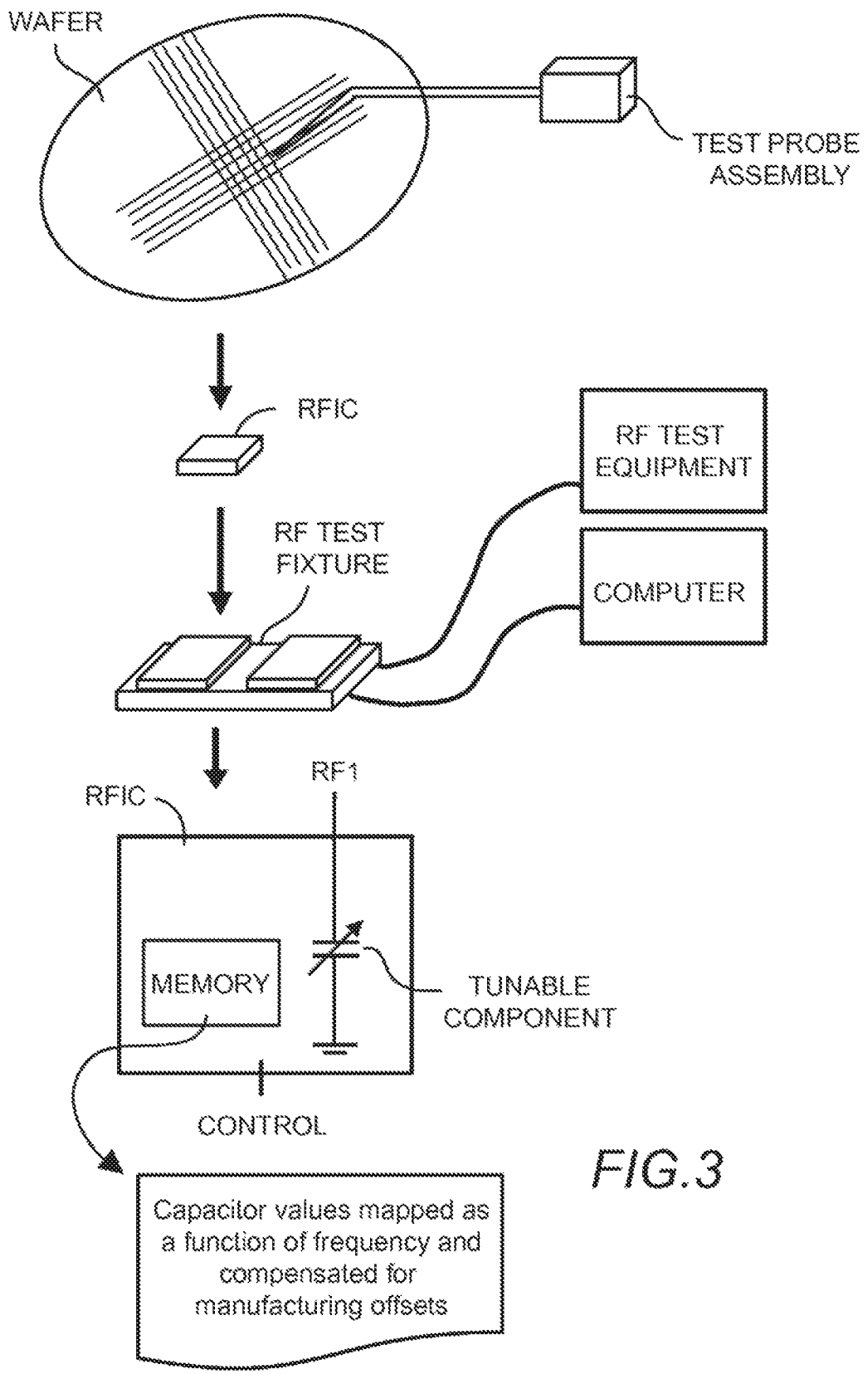
FIG. 3 illustrates a process where an RFIC containing memory is encoded during the manufacturing process with information to compensate capacitor values for manufacturing offsets.

FIG. 3 illustrates an example of a process where an RFIC containing memory is encoded during the manufacturing process with information to compensate capacitor values for manufacturing offsets. Parameters such as the $C_{min}$ and $C_{max}$ as a function of frequency can be measured and stored in memory.

Figure 4:
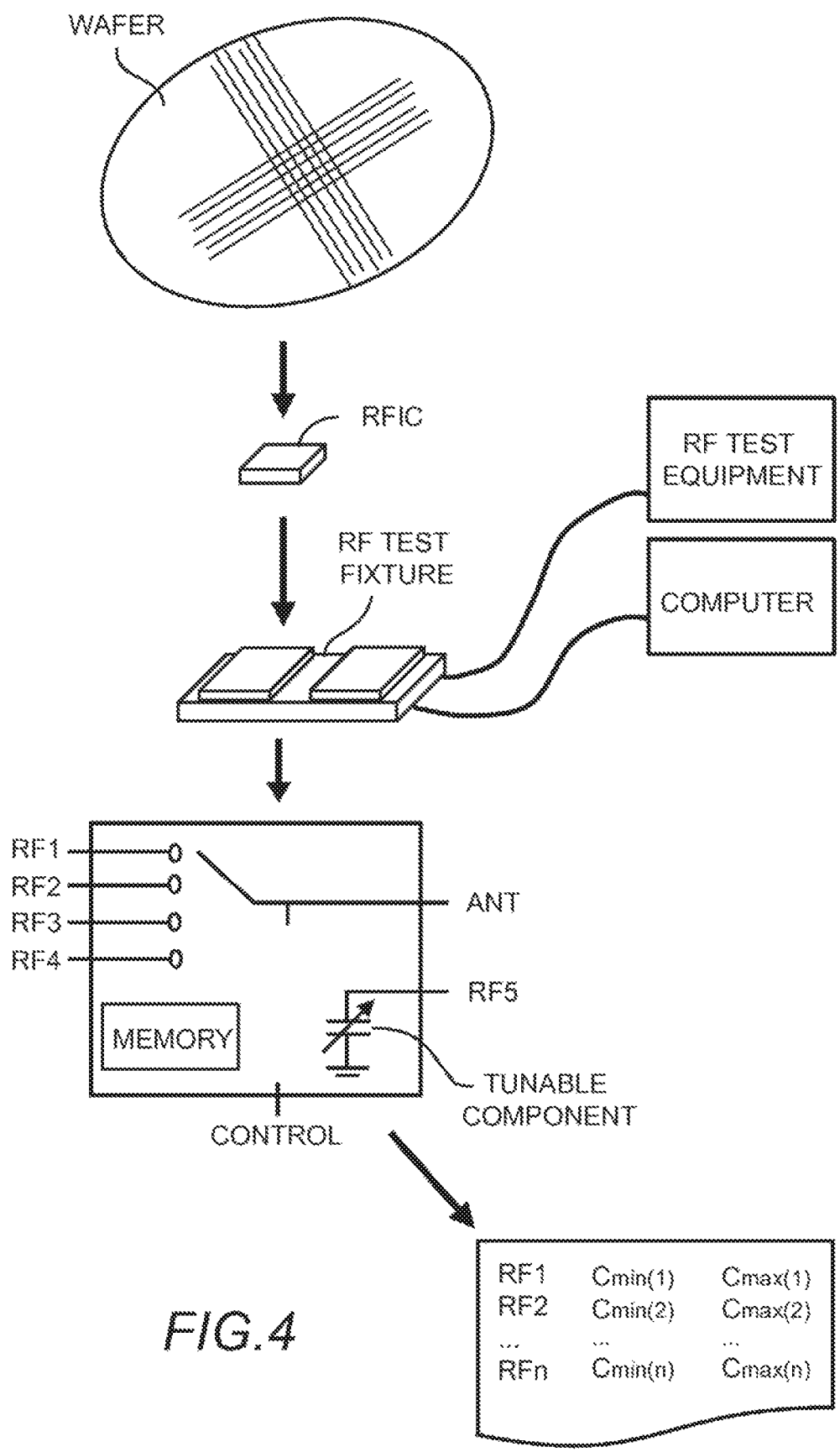
FIG. 4 illustrates a process where an RFIC containing memory is encoded during the manufacturing process using a test fixture.

FIG. 4 illustrates a process where an RFIC containing memory is encoded during the manufacturing process using a test fixture. For an RFIC containing tunable capacitors and multi-port switches, the capacitor values can be customized per switch port setting for a specific design or application.

Figure 5:
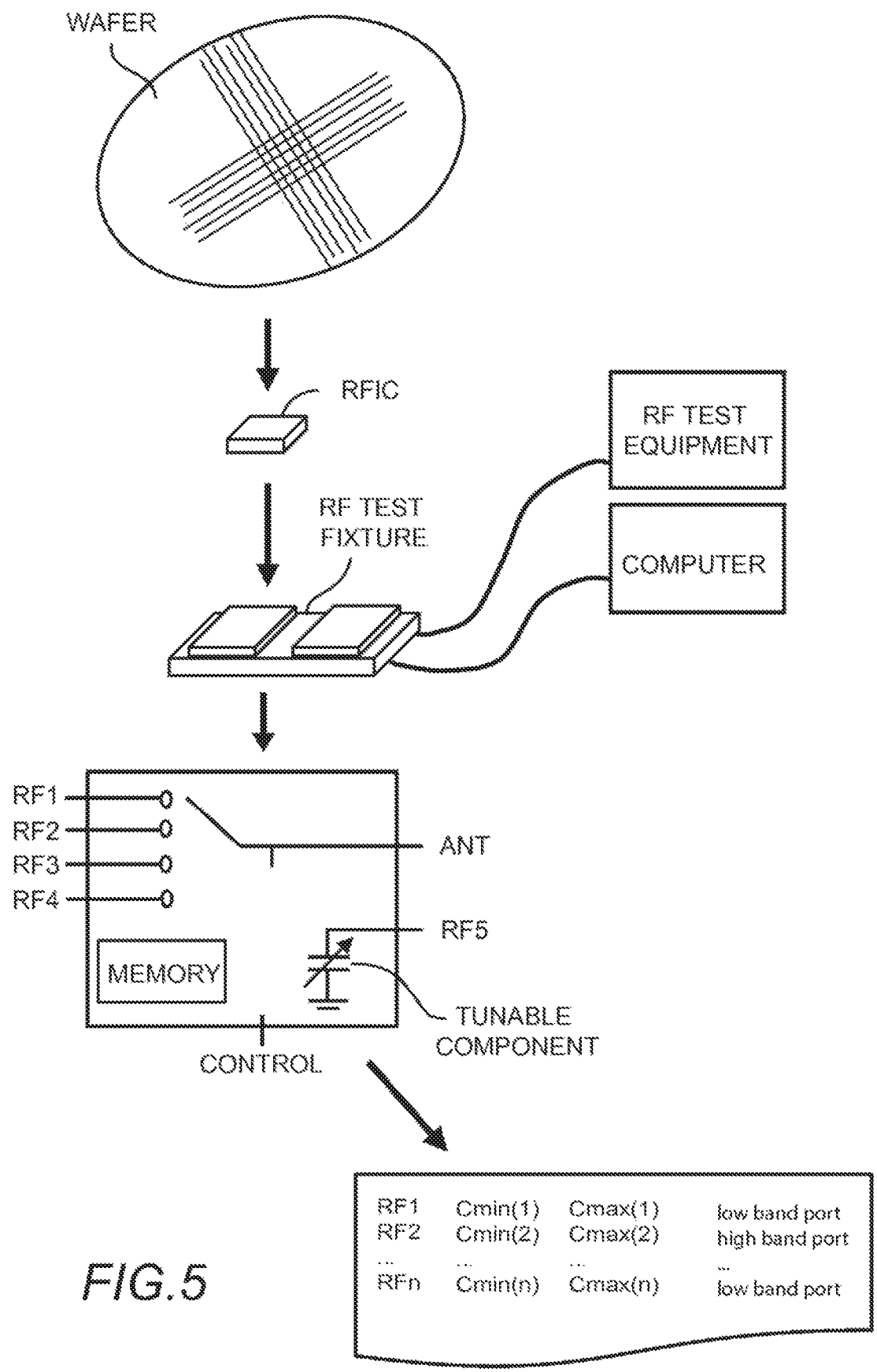
FIG. 5 illustrates another process where an RFIC containing memory is encoded during the manufacturing process using a test fixture.

FIG. 5 illustrates a process where an RFIC containing memory is encoded during the manufacturing process using a test fixture. For an RFIC containing multi-port switches, the switch ports can be characterized to determine the best ports to use at various frequency bands. The ports with the lowest insertion loss, for example, can be determined and used for the low band applications in specific applications. RF ports are measured and a determination is made as to: (i) best ports for low band insertion loss, and (ii) best ports for high band insertion loss.

Figure 6A:
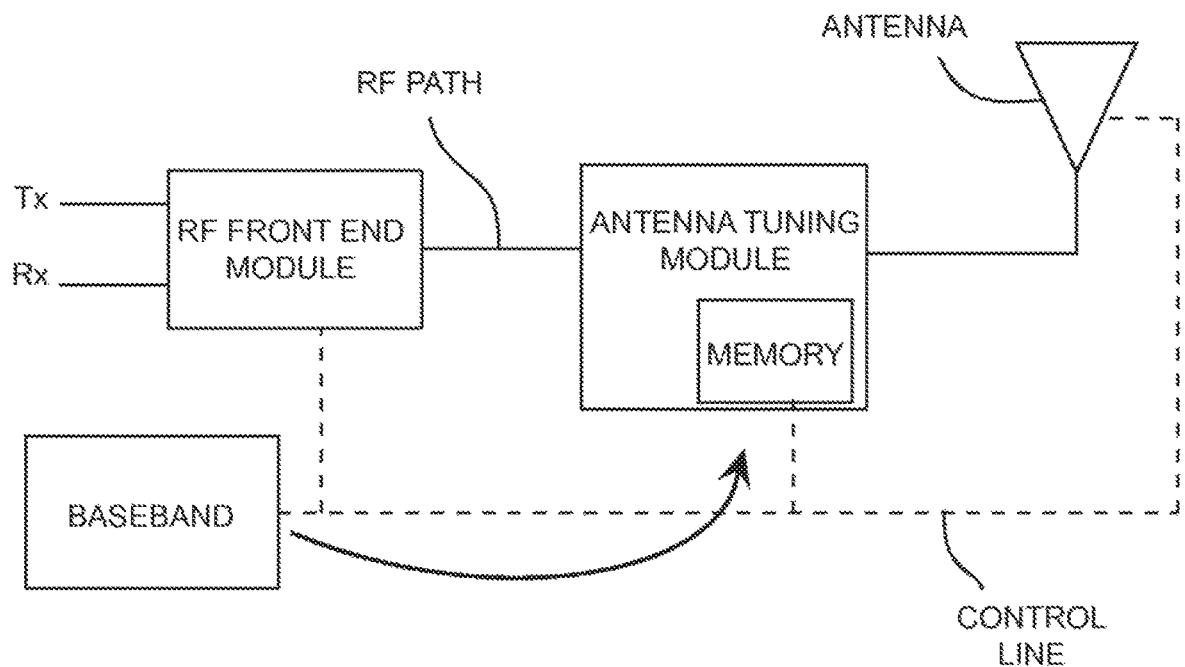
FIG. 6A illustrates an RFIC with memory in the form of an antenna tuning module which is used in conjunction with an RF front-end module, baseband, and antenna to form a communication system.

FIG. 6A illustrates an RFIC with memory in the form of an antenna tuning module which is used in conjunction with an RF front-end module, baseband, and antenna to form a communication system. A look-up table is resident in the memory and this look-up table is accessed by the baseband processor to determine antenna tuning states.

Figure 6B:
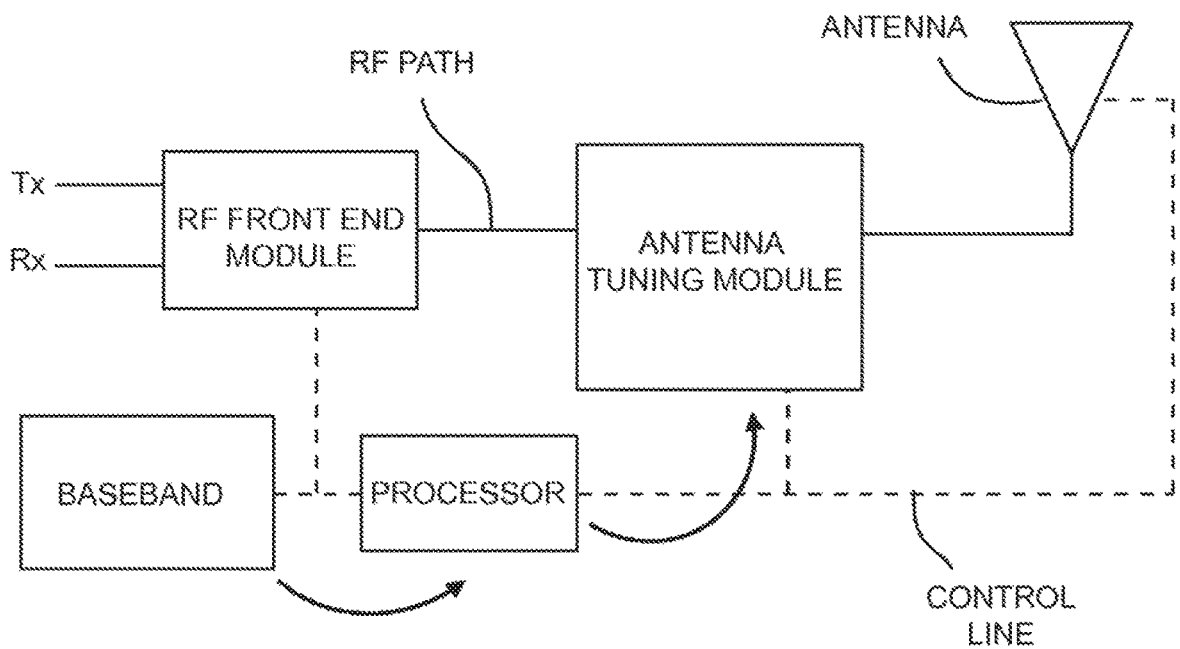
FIG. 6B shows a similar communication system to that of FIG. 6A, with the exception of the antenna tuning module, which in this case does not contain memory.

FIG. 6B shows a similar communication system to that of FIG. 6A, with the exception of the antenna tuning module, which in this case does not contain memory. An additional processor is integrated into this communication system and is used to house the look-up table. The baseband is required to access the memory in the processor and then send control signals to the antenna tuning module.

Figure 7:
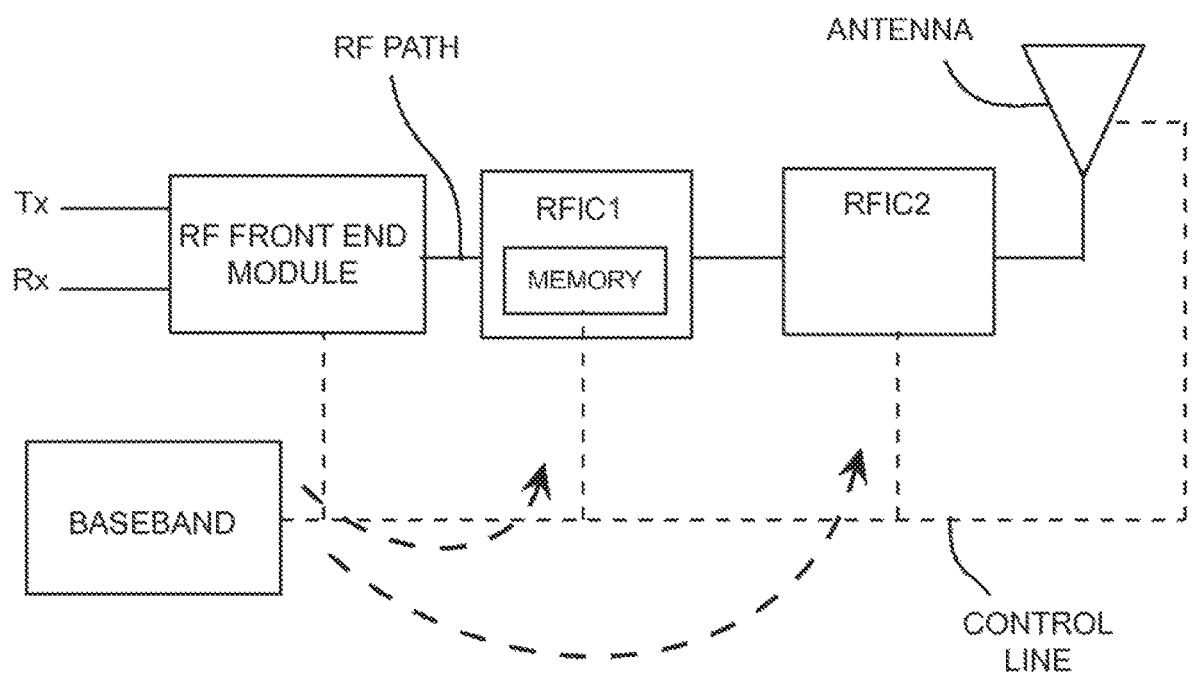
FIG. 7 shows an antenna system with a first RFIC including memory and a second RFIC which does not contain memory.

FIG. 7 illustrates a first RFIC with memory labeled as RFIC 1, and a second RFIC labeled as RFIC 2 which does not contain memory. The first and second RFICs are used in conjunction with an RF front-end module, baseband, and antenna to form a communication system. A look-up table is resident in memory of the first RFIC (RFIC 1) which contains tuning state or other relevant information for both the first RFIC (RFIC 1) and the second RFIC (RFIC 2). The baseband processor accesses the memory in RFIC 1 to provide control and/or tuning state information for both RFIC1 and RFIC 2.

Figure 8:
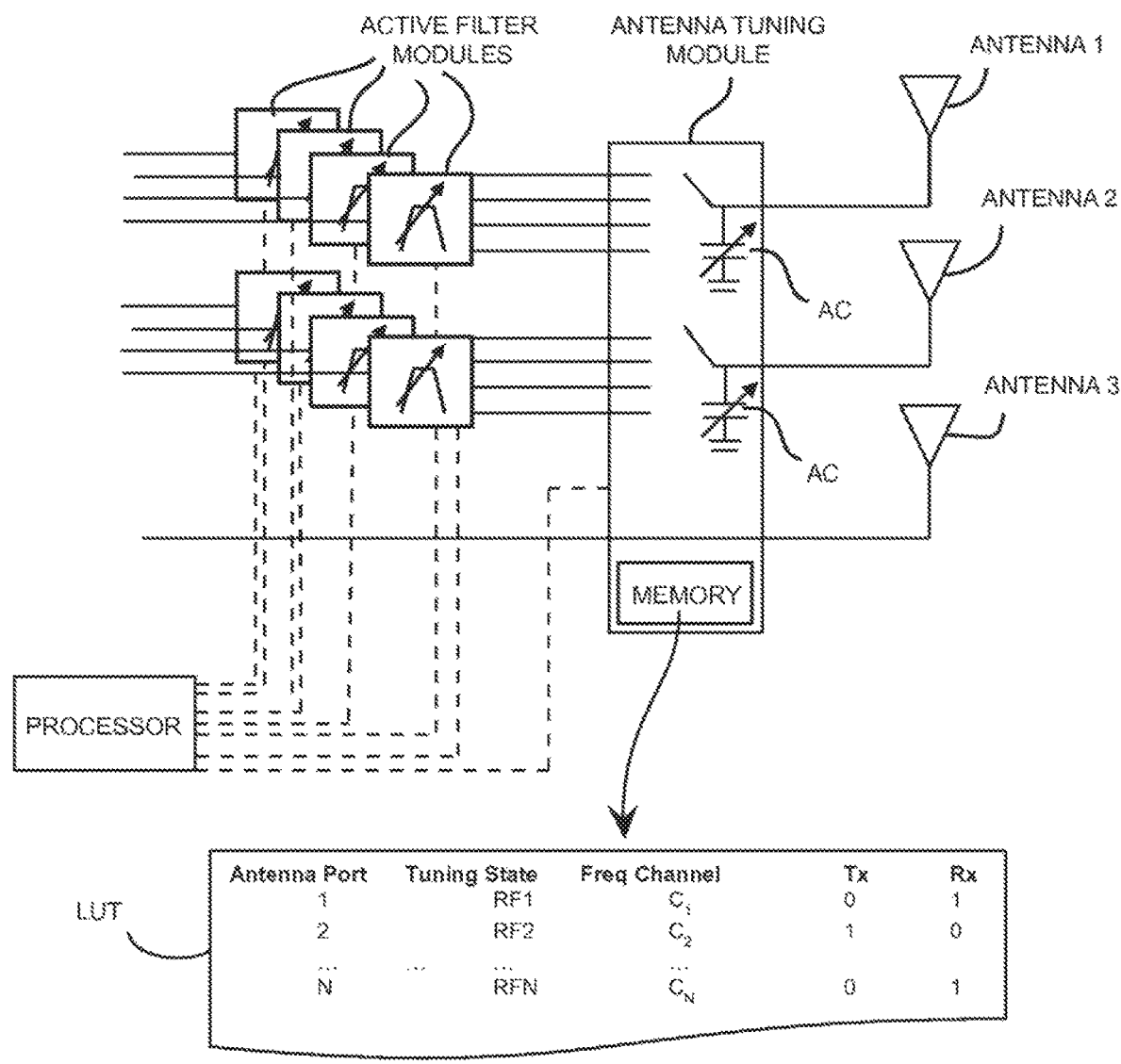
FIG. 8 shows an antenna system including an antenna tuning module which contains memory, the antenna tuning module being configured to connect with three antennas.

FIG. 8 shows an antenna system including an antenna tuning module which contains memory, the antenna tuning module being configured to connect with three antennas. Eight active filter modules are each connected to one of two four port switches which are integrated into the antenna tuning module. A processor is connected to each of the antenna tuning module and the eight active filter modules, wherein the processor is configured to send control information to the antenna tuning module and active filter modules. The information used to control the active filter modules and antenna tuning module is stored in the memory of the antenna tuning module.

Figure 9:
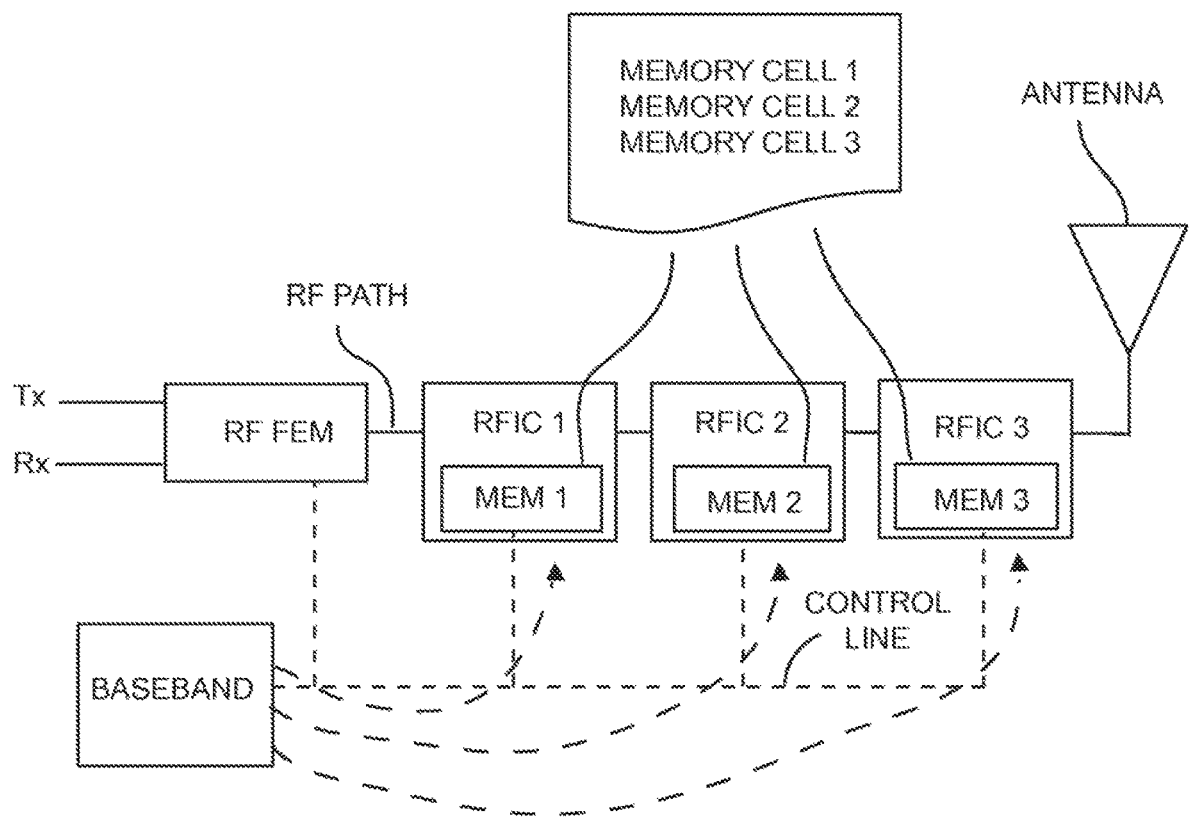
FIG. 9 shows an antenna system with three RFICs combining memory to provide a local memory block for use by one, two, or all three RFICs.

FIG. 9 shows an antenna system with three RFICs combining memory to provide a local memory block for use by one, two, or all three RFICs. Each of the first through third RFICs is connected to an RF path extending from an RF front end module, a baseband processor, and an antenna. The baseband processor is connected to the first through third RFICs via control lines extending therebetween.

Figure 10A:
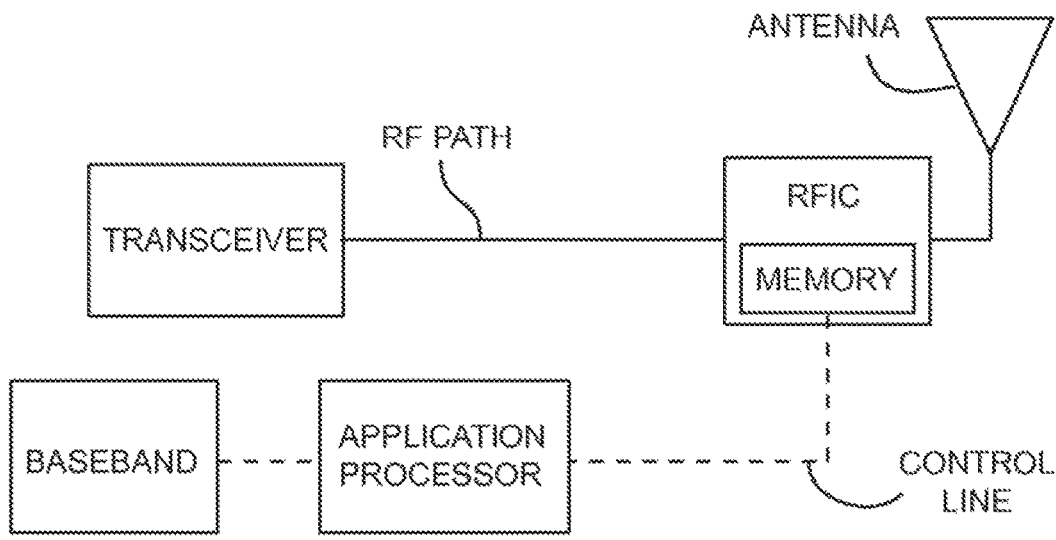
FIG. 10A shows an antenna system comprising an antenna coupled to an RFIC containing memory.

FIG. 10A shows an antenna system comprising an antenna coupled to an RFIC containing memory. The RFIC is further coupled to a transceiver via an RF path, and further coupled to an application processor and baseband via control lines. The application processor is configured to access the memory of the RFIC to access a lookup table for receiving control settings for configuring the active components of the antenna.

Figure 10B:
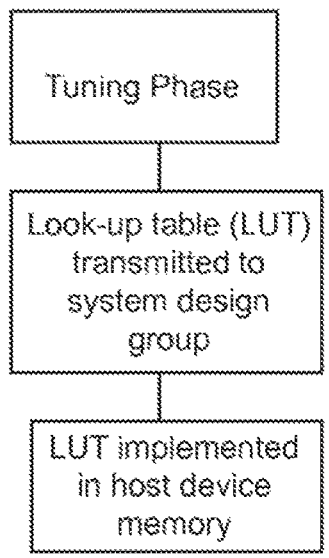
FIG. 10B illustrates an example of a design phase process wherein an RFIC is integrated into a host device and a tuning phase occurs during prototyping.

FIG. 10B illustrates an example of a design phase process wherein an RFIC is integrated into a host device and a tuning phase occurs during prototyping. After prototyping is complete, the look-up table used to drive the RFIC in the host device is provided to the system design group for implementation into on-board memory.

Figure 10C:
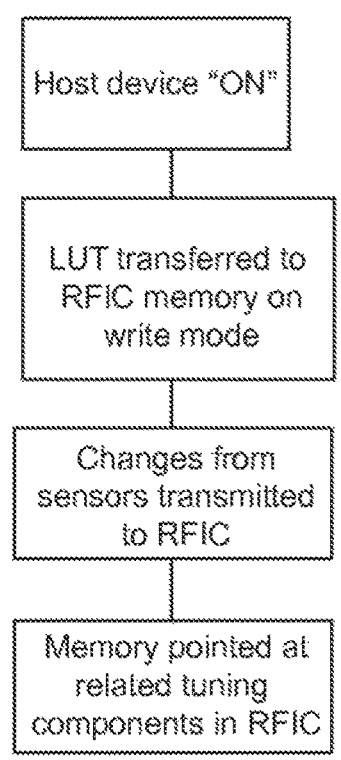
FIG. 10C shows an operation phase process, wherein the host device is turned on and the look-up table is transferred to the memory in the RFIC.

FIG. 10C shows an operation phase process, wherein the host device is turned on and the look-up table is transferred to the memory in the RFIC. Changes to on-board sensors are also transmitted to the look-up table in the RFIC memory.

Figure 11:
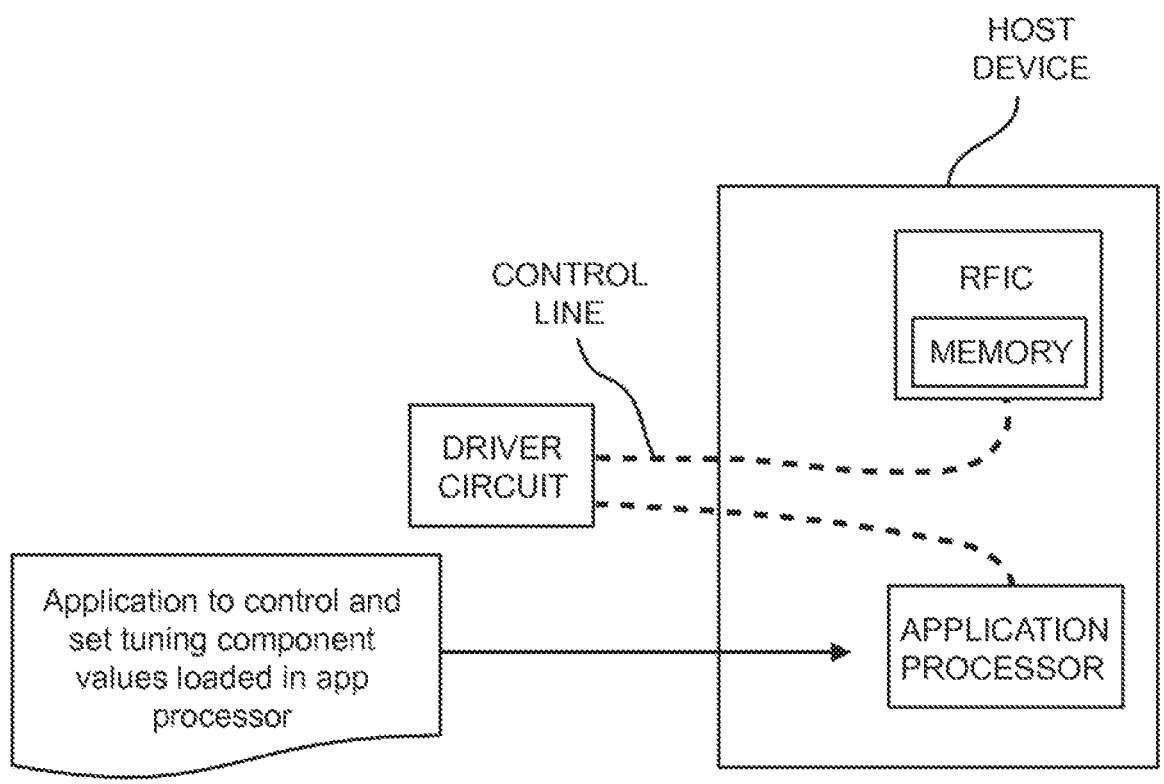
FIG. 11 illustrates a method for controlling the RFIC after integration into a host device by connecting a driver circuit to the RFIC and installing an application in the application processor.

FIG. 11 illustrates a method for controlling the RFIC after integration into a host device by connecting a driver circuit to the RFIC and installing an application in the application processor. The application can be used to control and set tuning states of components in the RFIC. This technique simplifies integration and tuning of an RFIC in a host device.

The invention claimed is:

1. A radio frequency integrated circuit, comprising:
   a multi-port switch configured to selectively couple one of a plurality of input ports of the radio frequency integrated circuit to a first output port of the radio frequency integrated circuit;
   a tunable component coupled between a ground reference and a second output port of the radio frequency integrated circuit, wherein the tunable component is in a separate path from the multi-port switch; and
   one or more memory cells, the one or more memory cells storing a look-up table comprising information associated with a plurality of tuning states for the tunable component;
   wherein each of the multi-port switch, tunable component, and one or more memory cells is embedded in the radio frequency integrated circuit.

2. The radio frequency integrated circuit of claim 1, wherein the information is on-wafer encoded information.

3. The radio frequency integrated circuit of claim 1, wherein the radio frequency integrated circuit is coupled to an antenna.

4. The radio frequency integrated circuit of claim 3, wherein the antenna comprises an active antenna.

5. The radio frequency integrated circuit of claim 3, wherein the first output port is coupled to the antenna.

6. The radio frequency integrated circuit of claim 1, wherein the tunable component comprises a tunable capacitor.

7. The radio frequency integrated circuit of claim 6, wherein the information comprises tunable capacitor range data.

8. The radio frequency integrated circuit of claim 1, wherein the multi-port switch is configured to selectively couple one of four input ports to the first output port.

9. The radio frequency integrated circuit of claim 1, wherein the information comprises information associated with each port of the multi-port switch.

10. The radio frequency integrated circuit of claim 9, wherein the information associated with each port of the multi-port switch comprises one or more of insertion loss, return loss, or impedance.

11. A radio frequency integrated circuit, comprising:
    a multi-port switch configured to selectively couple one of a plurality of input ports of the radio frequency integrated circuit to a first output port of the radio frequency integrated circuit;
    a tunable component coupled between a ground reference and a second output port of the radio frequency integrated circuit, wherein the tunable component is in a separate path from the multi-port switch; and
    one or more memory cells, the one or more memory cells storing a look-up table comprising information associated with each port of the multi-port switch;
    wherein each of the multi-port switch, tunable component, and one or more memory cells is embedded in the radio frequency integrated circuit.

12. The radio frequency integrated circuit of claim 11, wherein the information is on-wafer encoded information.

13. The radio frequency integrated circuit of claim 11, wherein the radio frequency integrated circuit is coupled to an antenna.

14. The radio frequency integrated circuit of claim 13, wherein the antenna comprises an active antenna.

15. The radio frequency integrated circuit of claim 13, wherein the first output port is coupled to the antenna.

16. The radio frequency integrated circuit of claim 11, wherein the tunable component comprises a tunable capacitor.

17. The radio frequency integrated circuit of claim 16, wherein the information comprises tunable capacitor range data.

18. An antenna system, comprising:
    an active antenna;
    a radio frequency integrated circuit, the radio frequency integrated circuit comprising:
      a multi-port switch configured to selectively couple one of a plurality of input ports of the radio frequency integrated circuit to a first output port of the radio frequency integrated circuit;
      a tunable component coupled between a ground reference and a second output port of the radio frequency integrated circuit, wherein the tunable component is in a separate path from the multi-port switch; and
      one or more memory cells, the one or more memory cells storing a look-up table comprising information associated with a plurality of tuning states for the tunable component;
      wherein each of the multi-port switch, tunable component, and one or more memory cells is embedded in the radio frequency integrated circuit.

19. The antenna system of claim 18, wherein the active antenna is coupled to the first output port of the multi-port switch.

20. The antenna system of claim 18, wherein the system further comprises one or more processors, each of the one or more processors configured to perform operations, the operations comprising:
    accessing the lookup table;
    selecting a state from the plurality of possible tuning states of the tunable component; and
    sending a control signal for controlling the tunable component based at least in part on the state.

* * * * *